G. E. FISHER.
MACHINE FOR TREATING FRUIT.
APPLICATION FILED MAY 8, 1922.

1,430,069.

Patented Sept. 26, 1922.
5 SHEETS—SHEET 1.

Fig.1.

Inventor:
George E. Fisher
By Chas. J. O'Neill
ATTORNEY

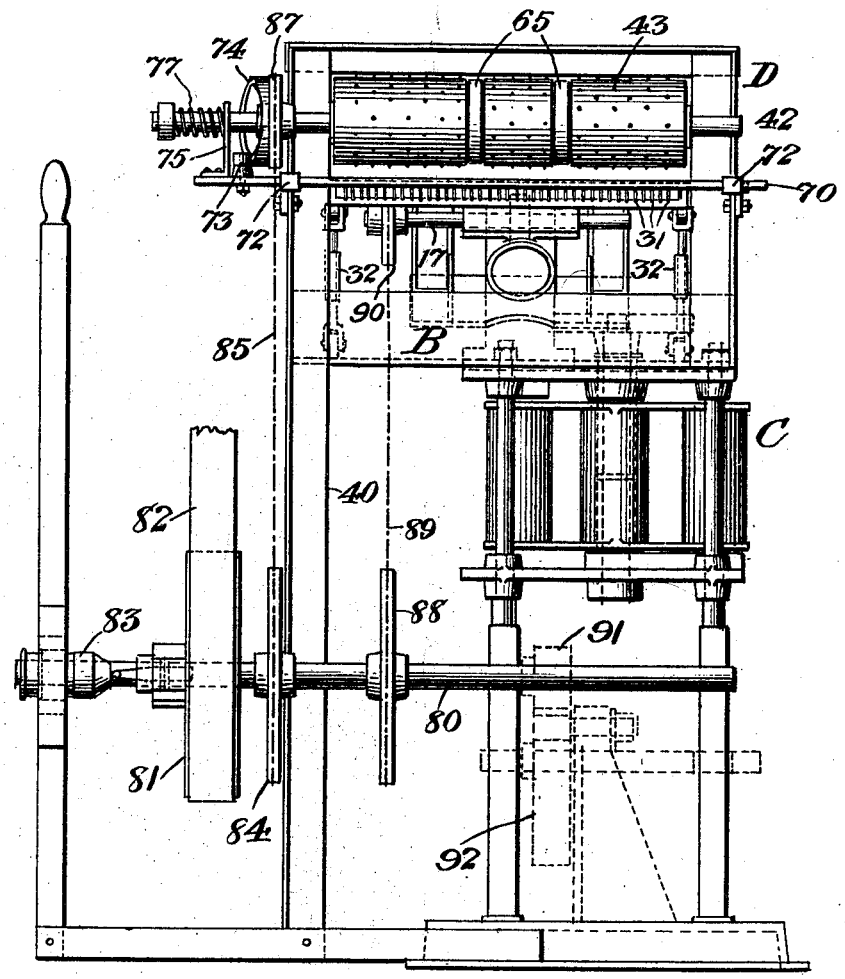

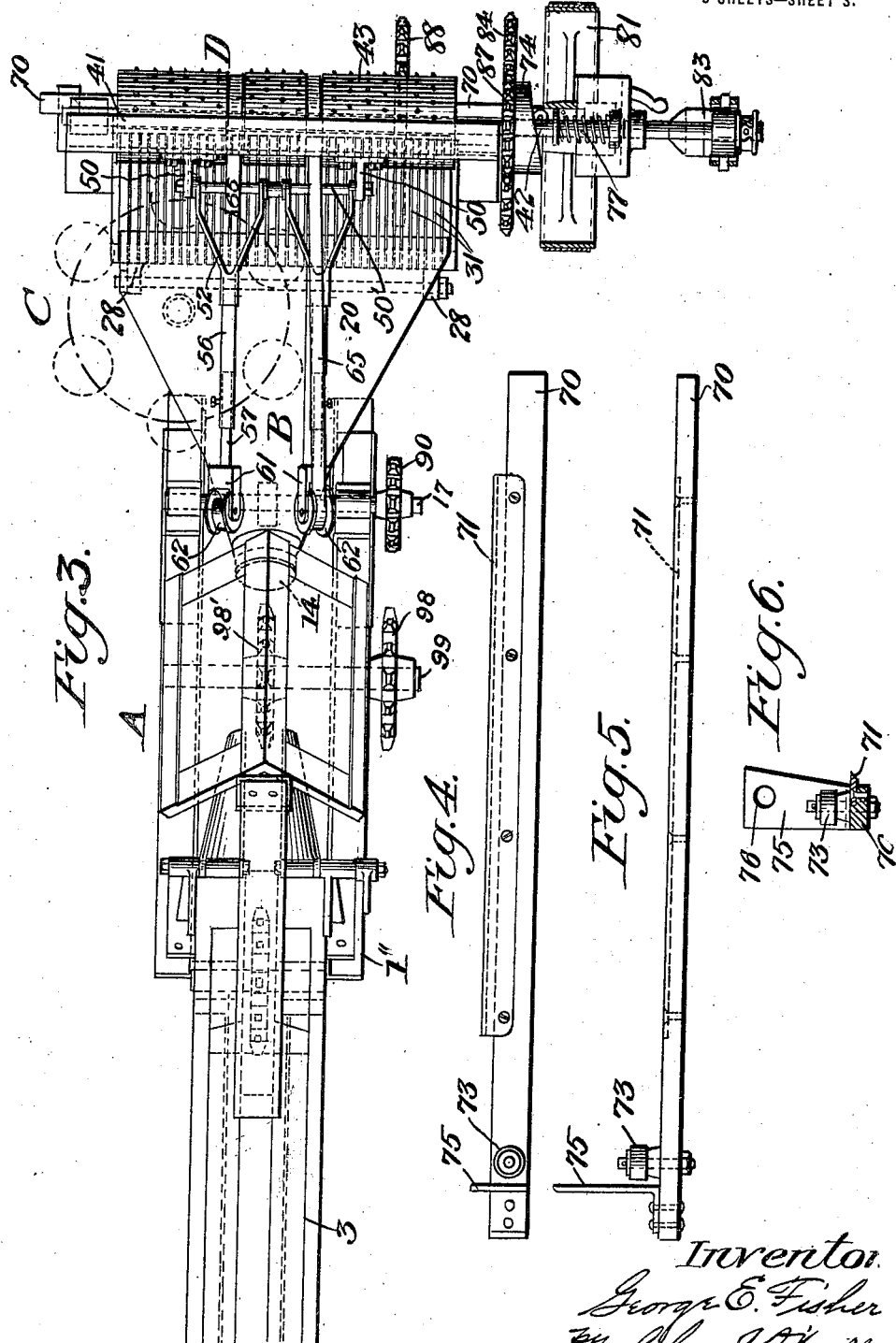

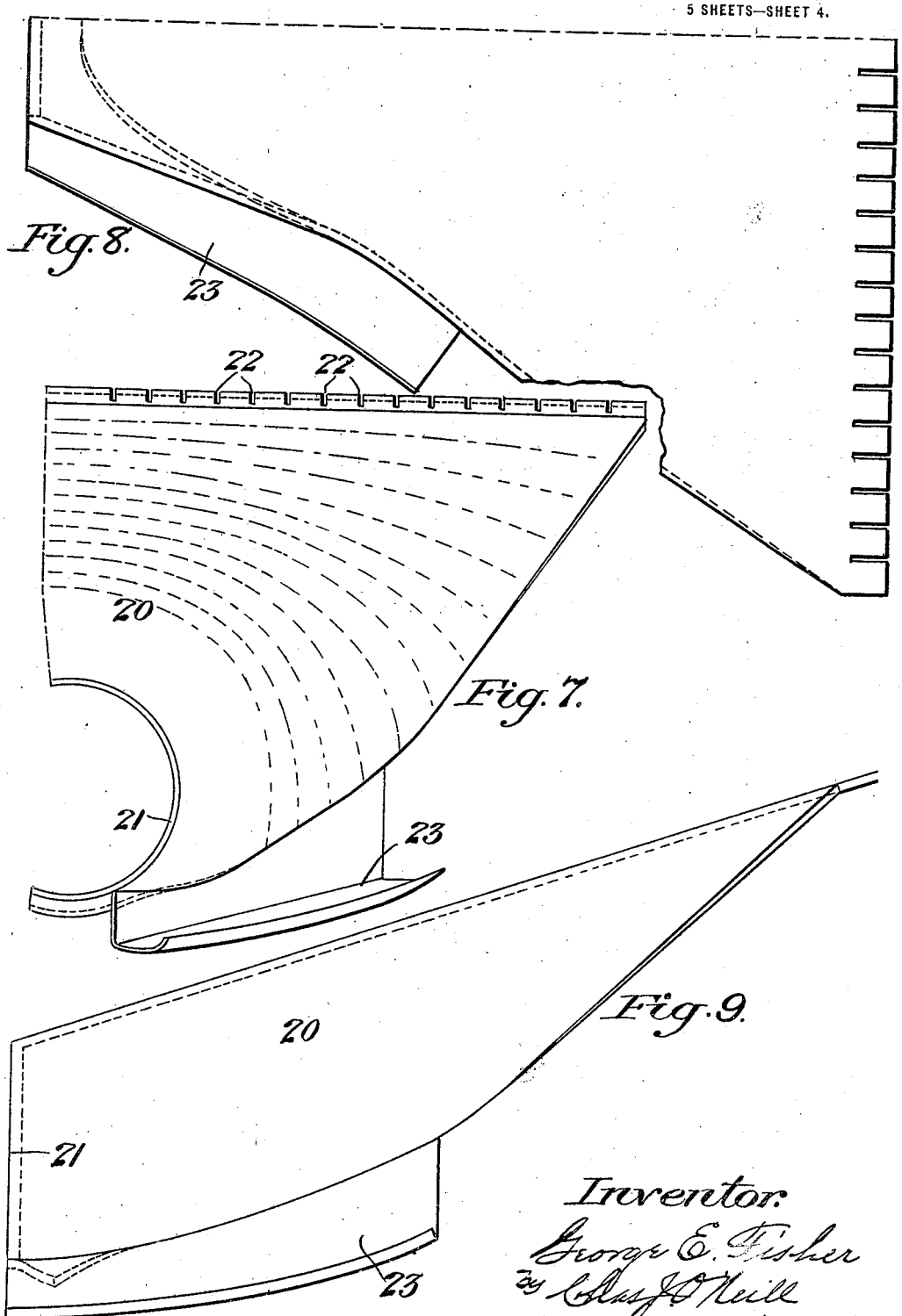

G. E. FISHER.
MACHINE FOR TREATING FRUIT.
APPLICATION FILED MAY 8, 1922.
1,430,069.
Patented Sept. 26, 1922.
5 SHEETS—SHEET 5.
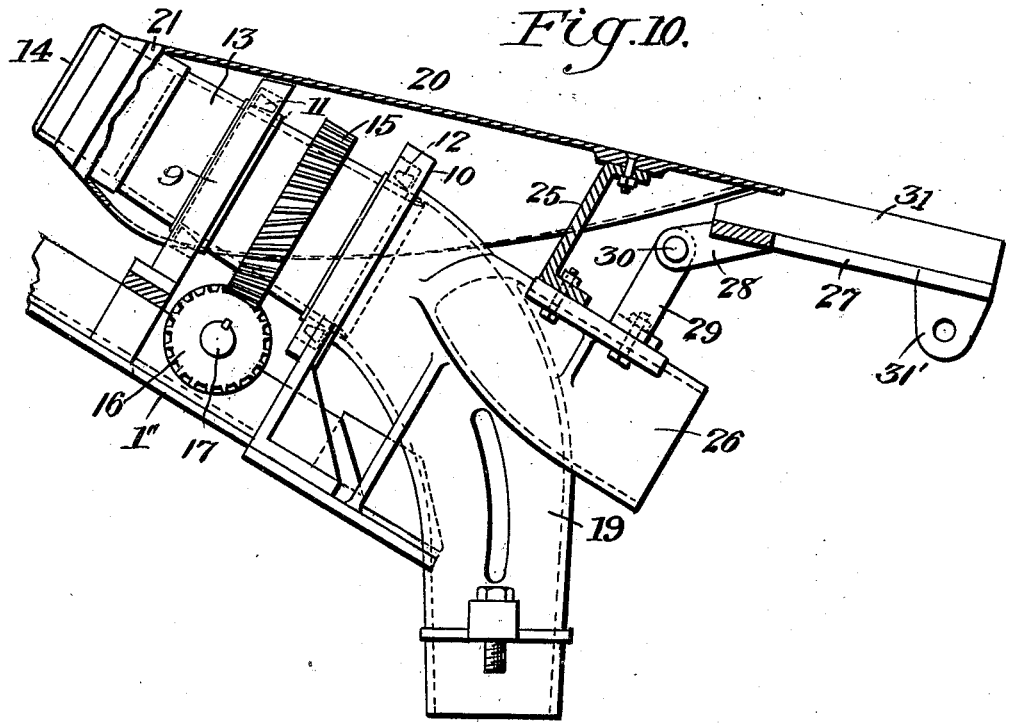
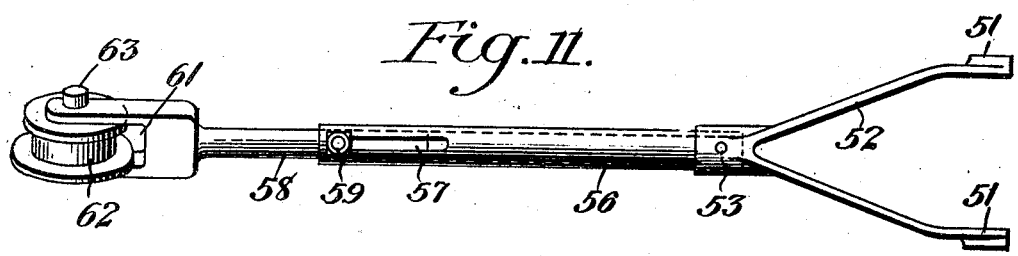
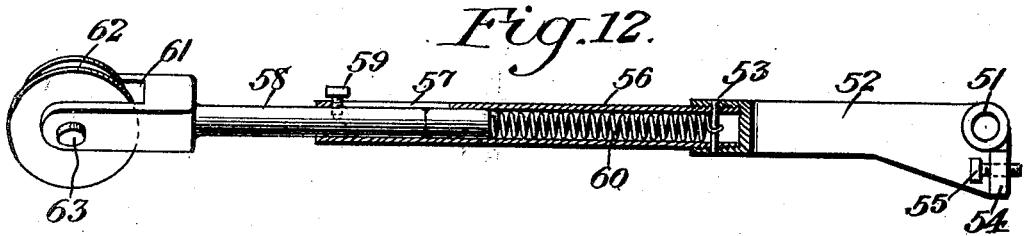
Inventor.
George E. Fisher.
by Chas. J. O'Neill
ATTORNEY Patented Sept. 26, 1922.

1,430,069

UNITED STATES PATENT OFFICE.

GEORGE EDWIN FISHER, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF HAWAII.

MACHINE FOR TREATING FRUIT.

Application filed May 8, 1922. Serial No. 559,420.

*To all whom it may concern:*

Be it known that I, GEORGE EDWIN FISHER, a citizen of the United States, residing at the city of Honolulu, Territory of Hawaii, have invented certain new and useful Improvements in Machines for Treating Fruit; and I do hereby declare the following to be a full, clear, and exact description of the invention, such as will enable others skilled in the art to which it appertains to make and use the same.

The invention relates to a unitary machine, including co-ordinated mechanism for sizing, coring and trimming fruit, more especially pineapples, and for removing the good portion of the meat from the shell or rind after the major portion of the fruit has been excised by the sizing knife. It has been suggested heretofore, more particularly in the patent to H. G. Ginaca, No. 1,060,250, to associate three separate machines, the first serving to size or cut out the prime central body portion of the fruit, the second to trim the ends of the sized sections, and remove the cores, and the third to cut or chop away the fruit meat adhering to the shells as the latter pass from the sizing machine. The present invention is designed to embody all the functions of the three separate machines of the Ginaca patent into a single co-ordinated mechanism that is practically automatic in operation and performs the several operations much more efficiently and in less time than is required with the older type of apparatus. To these ends, the invention comprises mechanism for feeding pineapples or the like through a centering device to a rotary sizing knife, which excises cylindrical sections from the body of the fruit, and discharges the same into the trimming and coring mechanism, the shells containing a large portion of good fruit meat being split as they leave the sizing knife and fed over a guide surface or plate the initial portion of which is substantially frusto-conical, and surrounds the sizing knife, and the intermediate portion, through a gradual decrease in lateral curvature, gradually merges into a plane surface, so that the hulls are presented to a special form of mechanism for cutting the meat from the hulls, the latter being fed over the guide surface by means of feed belts carried by pivoted arms so arranged as to maintain the lower run of the feed belt in substantial parallelism with the surface of the guide table. The mechanism to sever the meat from the shells includes a grid over which the shells, with the meat side downward, are fed, by the feed belts, to a roller associated with a reciprocating knife substantially parallel with the axis of the roller and with the discharge edge of the grid so that the knife cuts the meat from the shells without mutilating the latter, the shells and the severed meat being discharged by separate chutes.

The invention is illustrated in the accompanying drawings, in which

Fig. 1 is a side elevation, partly in section, of the machine, a portion of the feed conveyor being broken away;

Fig. 2 is a rear elevation of the machine;

Fig. 3 is a plan view;

Fig. 4 is a plan view showing the details of the reciprocating knife;

Fig. 5 is a front elevation of the same;

Fig. 6 is a vertical section through the knife;

Fig. 7 is a half front elevation of the guide table;

Fig. 8 is a half plan view of the latter;

Fig. 9 is a side elevation of the guide table;

Fig. 10 is an elevation partly in section of the sizing device and the guide table for the shells;

Fig. 11 is a plan view of one of the feed belt arms;

Fig. 12 is a side elevation partly in section of the same.

Referring to the drawings, 1, 1', indicate the elements of a suitable frame or support for the machine as a whole, which may be made up of castings and rolled metal sections of appropriate shapes and sizes. The forward part of the machine supports an inclined runway 3, up which the pineapples are fed in proper spaced relation by means of a travelling conveyor chain 2, which latter may be of any appropriate character and is only graphically indicated. The upper end of the runway 3 delivers the individual pineapples into a centering device, broadly indicated at A, and being of the same general type as that disclosed in the patent to H. G. Ginaca, No. 1,060,248, dated April 29, 1913, and which serves to automatically center the fruit and feed the same into proper position with respect to the sizing apparatus. Preferably the centering device and the sizing apparatus are located on the upper part of the machine at an angle to the horizontal, which facilitates the feeding of the individual pineapples through the centering device, and to the sizing mechanism.

The sizing element of the machine, represented generally by the character B comprises a rotary tubular member 13 terminating in its forward end in an annular knife 14, the axis of the tubular member 13 being in alignment with that of the centering device A. The rotary tubular member 13 is mounted in bearing brackets 9 and 10, supported from the main frame of the machine and provided with roller bearings 11 and 12 respectively, rotation being imparted to said tubular member by means of a pinion ring 15 secured thereto which meshes with a worm 16 mounted on a cross-shaft 17, as more particularly illustrated in Fig. 10. Secured to the bracket 10, and having its inlet end in telescopic engagement with the discharge end of the tubular member 13, is a curved discharge pipe 19, the lower end of which delivers the excised portions of the pineapples to a trimming and coring machine, designated by the reference letter C, said machine being of the same general type and involving the same mode of operation as that shown in the patent to H. G. Ginaca, No. 1,112,130, dated September 29, 1914, which latter serves to cut off both ends of the excised sections of the fruit and also to remove the cores of the fruit, and finally deliver each sized, trimmed and cored fruit section from a discharge spout, ready for packing or further treatment.

Partly surrounding and overlying the sizing mechanism is a guide table which receives the shells after the central sections of the meat have been cut from the pineapples, and spreads the shells so that they are accurately flattened out for presentation to another part of the machine, which cuts the meat from the shells, as will be explained hereinafter. In order to permit the flattening of the shells, the latter are cut by two knives 5 and 6 located above and below and in close proximity to the rotary sizing knife 14, said knives 5 and 6 serving to slit the shells as the latter pass on to the guide table. Said guide table comprises a forward section 21, which is substantially frusto-conical in shape and surrounds the rotary tubular member 13 just back of the sizing knife. Beyond the frusto-conical section of the guide table, the latter flares outwardly and upwardly with a gradual decreasing curvature until it merges into a substantially flat surface at its extreme rear edge, where it is provided with suitable notches 22 adapted to engage the ribs or plates of the grid device associated with the mechanism for trimming the meat from the shells. Preferably, each side of the guide table 20 adjacent the forward portion, is provided with gutters 23 which serve to collect the juice expressed from the meat and direct the same into suitable receptacles and prevent it falling on the mechanism. The rear end of the guide table 20 is supported by a bracket 25, which in turn is mounted upon a projection 26 extending from the discharge spout 19, as illustrated in Figs. 1 and 10.

In substantial alignment with the rear end of the guide table 20 is a grid, comprising a series of parallel bars 31, which may be formed integral with a frame 27, having ears 28 on its front edge near each end supported on a rod 30 mounted in brackets 29 bolted to the projection 26. The rear edge of the grid frame is provided with lugs 31' which are engaged by suitable adjusting rods 32 which in turn are anchored at their lower ends to the frame-work of the machine, as shown in Fig. 1, so that the rear end of the grid may be accurately adjusted vertically.

Journalled on standards 40 at the opposite sides of the rear end of the machine is a shaft 42 upon which is mounted a feed drum 43 provided with a spiked surface, which engages the flattened shells of the pineapples and feeds the same through the machine while the knife is severing the meat from the shells.

Mounted in two spaced brackets 50, 50, which are secured to the cross-bar 41 of the frame section 40, is a rod 50' upon which is pivoted two lever arms which overhang the guide table 20 and support two feed belts 65 which draw the shells from the sizing knife over the guide and flattening table. Each of said arms comprises a forked rear section 52 having the perforated ears 51, 51, pivoted on the rod 50' and a cylindrical boss 53 on its forward end which receives the screw-threaded end of a tubular section 56, which latter receives a rod 58 provided with a set-screw 59 engaging a slot 57 in the tubular member. A helical spring 60 mounted in the tubular member 56 tends to force the rod section 58 outward. The forward end of the rod 58 is provided with a yoke member 61 in which is journalled a grooved belt pulley 62 on a pintle 63. The rear end of each of the lever arms is provided with a lug 54 carrying an adjustable set-screw 55 adapted to engage a pendant arm or abutment on the corresponding bracket 50 to limit the downward movement of the corresponding lever arm so that the latter may be accurately adjusted with respect to the surface of the table 20. Co-operating with each of the pulleys 62 of the lever arms and engaging corresponding grooves in the feed roller 43, are feed belts 65 65 which are provided with spikes or spines to engage the shells of the pineapples, and draw the latter over the feed table. It will be noted that the axes of the belt pulleys 62 are inclined to the horizontal so as to twist or skew the respective belts into substantial parallelism with the subjacent surface of the guide table 20, so that the shells of the pineapples in moving over the table will be held in close contact with the surface thereof, and gradually flattened out. It will also be observed that the pivotal mounting of the belt carrying lever arms will permit the latter to accommodate themselves to shells of varying thickness, without, however, permitting the travelling belt to come in contact with the surface of the guide table.

Slidably mounted in brackets 72 below the feed roller 43, and adjacent the rear end of the grid frame 27, is a knife bar 70 carrying a knife 71, somewhat longer than the width of the grid. On one end of the bar 70 there is secured a roller 73, which engages the edge of a cam ring 74 mounted on the shaft 42. Adjacent the roller 73 is a bracket 75 secured to the end of the bar and provided with a perforation 76 through which the shaft 42 projects, and a spring 77 surrounding the shaft and engaging the bracket 75 holds the roller 73 in engagement with the cam ring 74 at all times, so that the rotation of the shaft 42 causes the knife bar to reciprocate transversely of the machine, thereby producing a draw cut, which has been found to be most effective in severing the meat from the shells.

Two discharge chutes 100 and 101, diagrammatically illustrated in Fig. 1, are provided for delivering the shells and the meat severed therefrom as the latter are discharged from the machine. Any suitable mechanism may be employed for operating the various moving parts of the machine, as described, and a typical driving mechanism is diagrammatically illustrated by dotted lines in Fig. 1, the same comprising a main shaft 80 provided with a pulley 81, and drive belt 82, said pulley being controlled by a suitable clutch 83 of any appropriate form. A sprocket wheel 84 mounted on the shaft 80 is connected by chain 85 to a sprocket wheel 87 on shaft 42 and preferably formed as an integral part of the cam ring 74, said sprocket gearing serving to drive the feed roller 43 and the reciprocating knife of the meat eradicating element D of the machine. A similar sprocket wheel 88 drives a chain 89 which engages a sprocket wheel 90 mounted on the shaft 17, to which is secured the worm gear 16, which operates the rotary sizing knife. Suitable gearing 91, 92, 93 and 94 connects the main drive shaft 80 with a counter shaft 95 on the trimming and coring machine C, the elements of which are operated by proper gearing connected with said shaft 95. Also mounted on the shaft 95 is a sprocket wheel 96 driving chain 97, which in turn engages a sprocket wheel 98 mounted on a counter-shaft 99 journalled in the main frame of the machine, upon which is mounted a sprocket wheel 98' which drives the feed chain 2 co-operating with the runway 3, by means of which the pineapples are successively fed in proper spaced relation to the machine.

In the normal operation of the machine, the pineapples are delivered to the lower end of the runway 3 and are carried up the latter by suitable abutments on the feed chain 2, and are delivered successively to the centering device, through which they are carried by the feed chain and presented with their butt ends to the rotary sizing knife 14. As each fruit engages the sizing knife, the shell is cut or incised longitudinally by the knives 5 and 6. Each of the fruit passing through the centering machine forces the next one ahead of it forward against the sizing knife, which cuts a cylindrical section from the body of the fruit, which is eventually forced through the rotary member 13 into the discharge spout 19 and thence into the first compartment of the trimming and coring machine C, in which latter machine the ends of the sized fruit sections are cut off and the cores removed, as described in the Ginaca patent aforesaid, the properly sized, trimmed and cored sections being ultimately discharged from the machine C. While the central portion of the fruit is being excised by the rotary knife 14, the shell which is still attached to the body of the fruit is gradually spread by the frustoconical section 21 of the feed table 20, and forced into engagement with the feed belts 65, 65, which draw the shells forward along the feed table, where the said shells are gradually flattened out until they engage the bars 31 of the grid frame 27. The meat side of the shells being downward, the grid bars 31 cut through the meat severing the same into longitudinal strips, and as the shells are fed under the feed roller 43, the reciprocating knife 71 carried by the bar 70 cuts the meat cleanly from the shells and the severed meat strips are then discharged by the feed belts and the feed roller into the chute 101, whence they are delivered to suitable receptacles. The shells, on the other hand, passing between the knife and the surface of the feed roller, are discharged by the chute 100.

It will be particularly noted that the operation of the machine is substantially automatic and requires little personal attention, so that instead of requiring the services of at least two operatives for each particular element of the machine, namely, the sizing apparatus, the trimming and coring apparatus, and the meat eradicating apparatus, the entire concrete machine may be successfully operated by one or two persons, one of whom feeds the pineapples to the machine, and the other devotes his attention to the proper operation of the several mechanisms.

What I claim is:

1. A machine for treating fruit comprising a rotary tubular sizing head, means for slitting the shells, a guide table for flattening the shells including a substantially frusto-conical section surrounding the sizing head, and a laterally and upwardly flaring extension gradually merging into a plane surface, and means associated with said guide table for trimming the meat from the shells.

2. A machine for treating fruit comprising a rotary tubular sizing head, means for slitting the shells, a guide table for flattening the shells including a substantially frusto-conical section surrounding the sizing head, and a laterally and upwardly flaring extension gradually merging into a plane surface, means co-operating with said guide table for moving the shells over the table, and means associated with said table for trimming the meat from the shells.

3. A machine for treating fruit, comprising a feeding and centering apparatus, a rotary tubular sizing head adjacent the centering apparatus, a guide for the shells including a substantially frusto-conical section surrounding the sizing head, and an extension gradually decreasing in curvature and finally merging into a flat surface, and means receiving the shells from said guide for trimming the meat from the shells.

4. A machine for treating fruit, comprising a feeding and centering apparatus, a rotary tubular sizing head adjacent the centering apparatus, a guide for the shells including a substantially frusto-conical section surrounding the sizing head and an extension gradually decreasing in curvature and finally merging into a flat surface, pivoted arms overlying the guide table, feed belts running over said arms to engage the shells and move the same over the guide, and means receiving the shells from said guide for trimming the meat from the shells.

5. A machine for treating fruit comprising a rotary tubular sizing head, a guide table having a section surrounding the tubular head and an extension decreasing in curvature and merging into a plane surface to receive and flatten the shells, a grid adjacent the discharge end of said table, a reciprocating knife disposed transversely of said grid, a feed roller disposed above the knife, arms pivoted adjacent the roller and extending over and substantially parallel with the surface of the guide table, and feed belts engaging the roller and travelling over the ends of the pivoted arms to feed the shells over the table and grid to the reciprocating knife.

6. A machine for treating fruit comprising means for sizing the fruit, a guide table for receiving and flattening the shells, means including a grid, a feed roller and a knife for trimming the meat from the shells, and means for feeding the shells over the table including two arms pivoted adjacent said feed roller and overlying the table, and feed belts engaging the roller and passing over the ends of said arms in substantial parallelism with the surface of said table.

7. A machine for treating fruit comprising means for sizing the fruit, a guide table for receiving and flattening the shells, means including a grid a feed roller and a knife for trimming the meat from the shells, and means for feeding the shells over the table including two arms pivoted adjacent said feed roller and overlying the table having pulleys on their free ends and feed belts engaging the roller and passing over the pulleys on said arms in substantial parallelism with the surface of said table.

8. A machine for treating fruit comprising means for sizing the fruit, a guide table for receiving and flattening the shells, means including a grid a feed roller and a knife for trimming the meat from the shells, and means for feeding the shells over the table including two longitudinally yieldable arms pivoted adjacent said feed roller and overlying the table and feed belts engaging the roller and passing over the ends of said arms in substantial parallelism with the surface of said table.

9. A machine for treating fruit comprising means for sizing the fruit, a guide table for receiving and flattening the shells, means including a grid a feed roller and a knife for trimming the meat from the shells, and means for feeding the shells over the table including two longitudinally yieldable arms pivoted adjacent said feed roller and overlying the table having pulleys on their free ends and feed belts engaging the roller and passing over the pulleys on said arms in substantial parallelism with the surface of said table.

In testimony whereof I affix my signature.

GEORGE EDWIN FISHER.